United States Patent [19]

Baumann et al.

[11] 4,275,320
[45] Jun. 23, 1981

[54] RADIATION SHIELD FOR USE IN A SUPERCONDUCTING GENERATOR OR THE LIKE AND METHOD

[75] Inventors: Kai J. Baumann, Pittsburgh; Sui-Chun Ying, Monroeville, both of Pa.

[73] Assignee: Electric Power Research Institute, Inc., Palo Alto, Calif.

[21] Appl. No.: 905,042

[22] Filed: May 11, 1978

[51] Int. Cl.³ .............................................. H02K 9/00
[52] U.S. Cl. ...................................... 310/52; 310/261
[58] Field of Search ...................... 310/10, 40, 52, 54, 310/265, 64, 261; 336/DIG. 1

[56] References Cited

U.S. PATENT DOCUMENTS

| | | | |
|---|---|---|---|
| 3,764,835 | 10/1973 | Luck | 310/52 |
| 4,016,444 | 4/1977 | Gillet | 310/52 |
| 4,020,371 | 4/1977 | Gillet | 310/52 |
| 4,039,870 | 8/1977 | Sterrett | 310/52 |
| 4,076,988 | 2/1978 | Litz | 310/10 |
| 4,101,793 | 7/1978 | Berthet | 310/52 |
| 4,117,357 | 9/1978 | Baumann | 310/52 |
| 4,123,676 | 10/1978 | Cooper | 310/52 |

Primary Examiner—R. Skudy
Attorney, Agent, or Firm—Flehr, Hohbach, Test, Albritton & Herbert

[57] ABSTRACT

A method of thermal insulating a supercooled component of a superconducting apparatus is disclosed herein and includes a thermal radiation shield which is maintained at a reduced temperature relative to its ambient surroundings for more efficiently shielding its associated inner cooled component. The shield is cooled, preferably internally, by the direct application of a fluid refrigerant, specifically helium gas.

11 Claims, 5 Drawing Figures

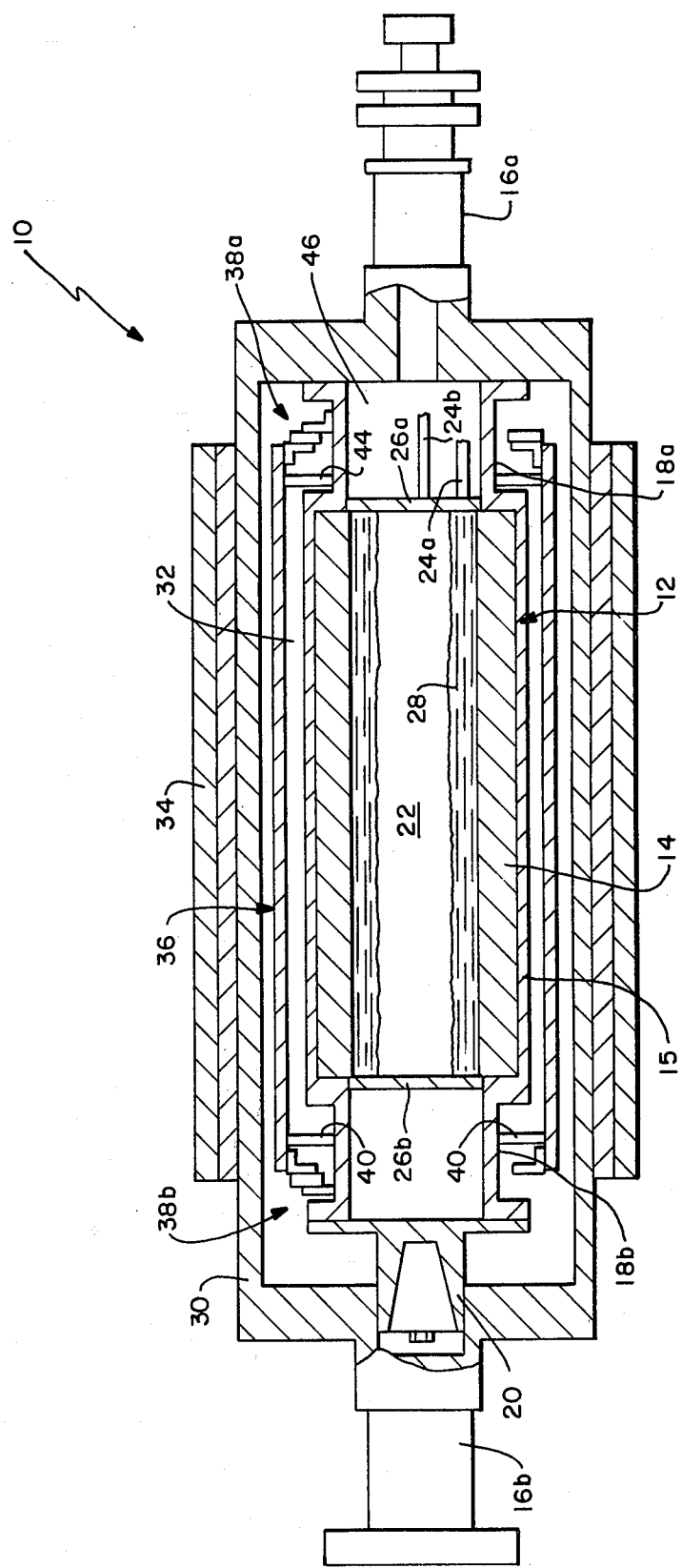
FIG.—1

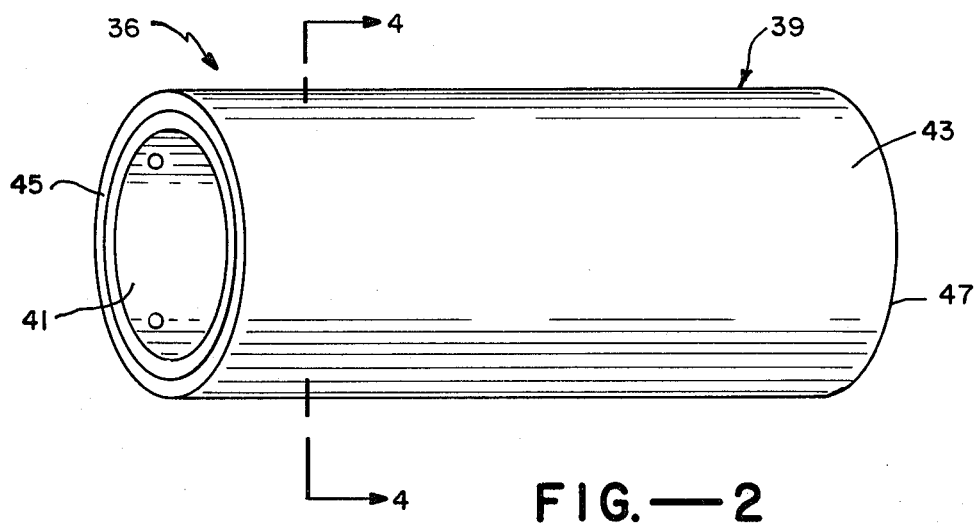
FIG.—2
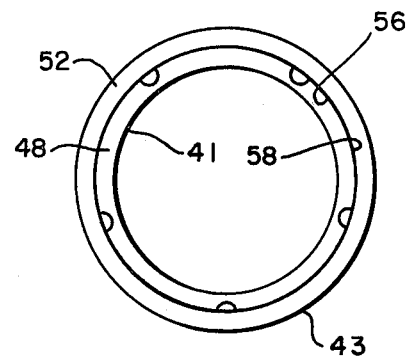
FIG.—4
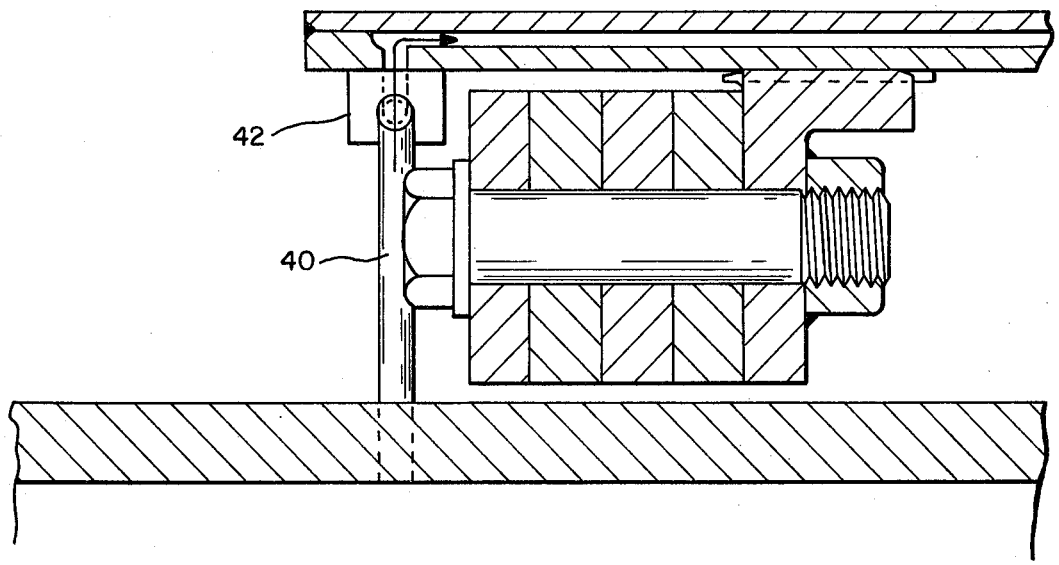
FIG.—5

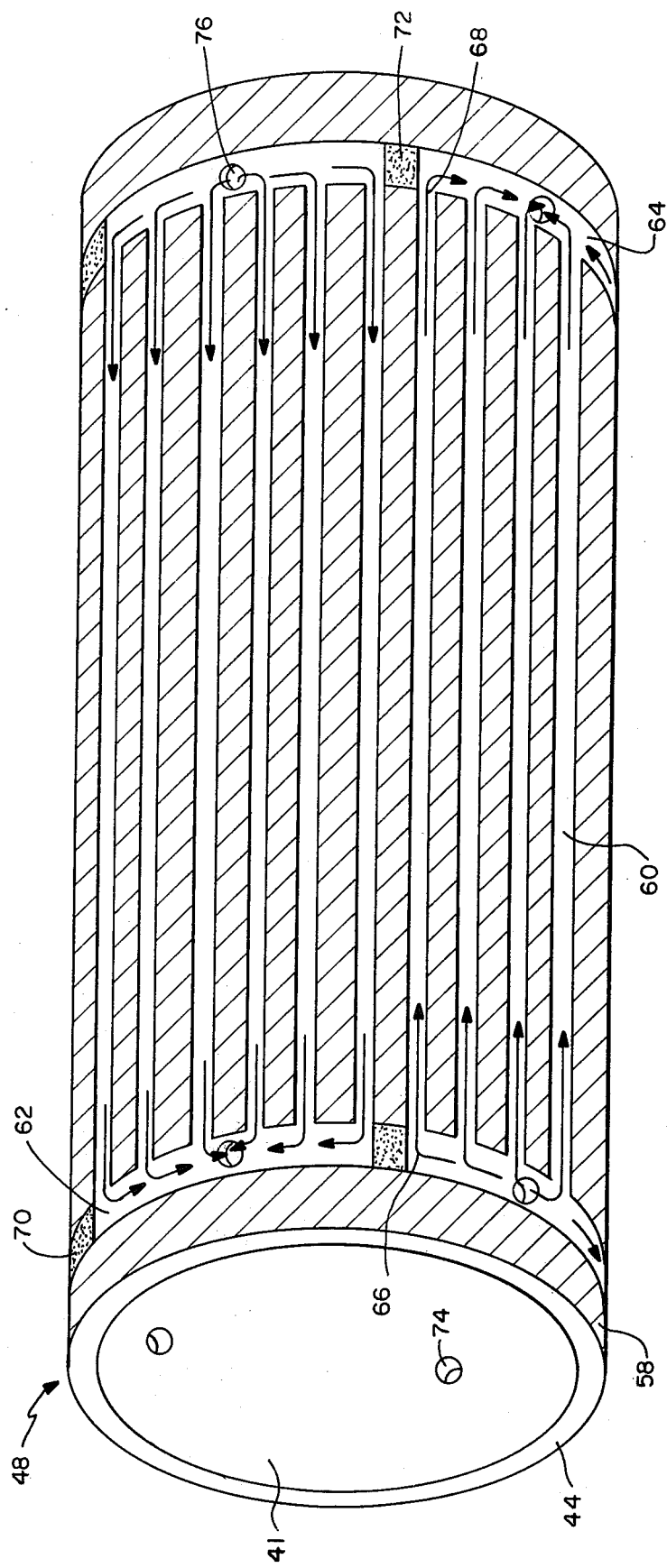
FIG.—3

RADIATION SHIELD FOR USE IN A SUPERCONDUCTING GENERATOR OR THE LIKE AND METHOD

BACKGROUND OF THE INVENTION

The present invention relates generally to a superconducting apparatus such as a superconducting turbine generator or the like and more particularly to a thermal radiation shield for use in such an apparatus.

Today, superconducting technology is being developed to provide practical applications for the superconducting properties of certain metals at low temperatures, specifically at temperatures within the liquid helium region. For example, the desirability of an electrical generator rotor with a superconducting field winding has led to many design studies. One viable configuration which has heretofore been suggested includes a supercooled inner rotor, specifically one cooled to a temperature of approximately $-450°$ F., containing a super-conducting field winding and a concentric warmer (approximately $+68°$ F. or higher) outer rotor which serves as the main structural element of the overall rotor assembly. A thermal radiation shield is utilized for thermally insulating the inner rotor. This particular configuration does of course include other components as will be described hereinafter.

One important aspect of a superconducting apparatus of the type generally recited is to keep the total heat leakage into its cold zone, that is, in the area around its supercooled inner rotor, relatively low in order to minimize the amount of refrigerant, specifically helium, required to supercool the inner rotor. This is very important if the superconducting generator is to compete with conventional generators, both in terms of economy and efficiency. There are a number of effective ways to reduce this total leakage, which leakage may result from thermal conduction, thermal convention, and thermal radiation. One way is to minimize the conduction paths between the cold zone and the warm zone, that is, the zone outside the supercooled inner rotor, by supporting the cold zone to the warm zone utilizing essentially only two long, thin torque tubes and associated torque tube heat exchangers. Moreover, heat transfer by means of both conduction and convection, specifically by ambient gases, are minimized by providing a high vacuum environment around the cold zone. However, in order to reduce the radiant transfer of heat into the cold zone, the most promising suggestion has been to utilize a cylindrical radiation shield in the annulus between the inner and outer rotors. This shield functions by intercepting thermal radiation which would otherwise impinge upon the surface of the cold zone.

There are a number of inherent problems associated with the utilization of a radiation shield of the type just described. In the first place, it should be apparent that the shield which is exposed to the warm zone will be of a higher temperature than the cold zone. Applicants have found that to increase efficiency, the shield should itself be cooled and, in accordance with the present invention, to maximize efficiency the shield should be cooled, preferably internally, by the direct application of a fluid refrigerant, specifically helium gas. Applicants have found that this in turn results in certain inherent problems. These problems include the difficulty of manufacturing a reliable, structurally sound and economical shield and yet one which is contemplated for use in a severe environment such as that of a superconducting turbine generator or the like. The shield is to be placed in the annulus between the inner rotor and outer rotor, which annulus is to be minimized for electrical coupling reasons and yet this creates additional problems. Specifically, this conflicts with the need to have a mechanically sound, relatively thick shield which is to survive nonuniform short circuit crushing loads, centrifugal overspeed stresses, short circuit torques, and internal helium pressures in the event of a winding quench or normalization. Moreover, radial deflections of the shield must be limited so as not to interfere with adjacent machine parts.

As will be seen hereinafter, the present invention provides a radiation shield which is cooled, preferably internally cooled, by the direct application of a fluid refrigerant and yet an economical shield which is structurally sound, reliable in use and readily assembled.

OBJECTS AND SUMMARY OF THE INVENTION

One object of the present invention is to provide a thermal radiation shield which is especially suitable for use in a superconducting apparatus such as a superconducting turbine generator or the like including an internal cold zone and which is provided for intercepting thermal radiation which would otherwise impinge upon the surface of this cold zone.

Another object of the present invention is to provide a thermal radiation shield which is designed to be cooled below ambient temperature by the direct application of fluid refrigerant, specifically helium gas in a preferred embodiment.

Still another object of the present invention is to provide a thermal radiation shield which is specifically designed to be internally cooled by the fluid refrigerant.

Yet another object of the present invention is to provide a shield which is readily assembled, economical to provide and reliable in use and yet one which displays the structural integrity and relative thinness necessary for use in a relatively severe environment such as that of a superconducting turbine generator or the like.

A further object of the present invention is to provide a method of thermal insulating a supercooled component in a superconducting apparatus, for example, a supercooled rotor in a superconducting turbine generator, utilizing the radiation shield just recited.

As stated previously, the present invention relates to the thermal insulation of a supercooled component in a super conducting apparatus. As also stated, this is accomplished in accordance with the present invention by utilizing a thermal radiation shield and by applying fluid refrigerant, specifically helium gas in a preferred embodiment, in direct contact with the shield for cooling the latter to a temperature below its ambient surroundings.

In a preferred embodiment, as will be seen hereinafter, the thermal shield is internally cooled by passing the helium gas through its main body. In order to accomplish this, the shield body includes internal passage means adapted for passing the helium vapor or other such fluid refrigerant therethrough, entry passage means extending into the shield body and into fluid communication with the internal passage means for introducing the fluid refrigerant therein, and exit passage means also extending into the shield body and in fluid communication with the entry passage means for passing the refrigerant out of the shield body.

BRIEF DESCRIPTION OF THE DRAWING

FIG. 1 is a diametral sectional view of a superconducting turbine generator constructed in accordance with the present invention.

FIG. 2 is a perspective view of a thermal radiation shield which comprises part of the generator illustrated in FIG. 1 and which is designed in accordance with the present invention.

FIG. 3 is a perspective view of an inner shell comprising part of the thermal radiation shield illustrated in FIG. 2.

FIG. 4 is a cross sectional view of the shield illustrated in FIG. 2, taken generally along the line 4—4 in FIG. 2.

FIG. 5 is an enlarged view, partially in section, of one section of the superconducting turbine generator illustrated in FIG. 1.

DETAILED DESCRIPTION AND PREFERRED EMBODIMENTS

Turning now to the drawings, wherein like components are designated by like reference numerals, attention is specifically directed to FIG. 1 which illustrates a superconducting turbine generator constructed in accordance with the present invention and generally designated by the reference numeral 10. As illustrated in this figure, the generator includes a cylindrical supercooled inner rotor assembly 12 containing superconducting field windings 14 mounted to and concentrically within a field winding support 15 which is also extended. This entire assembly is fixedly connected at its opposite ends with opposite bearing journals 16a and 16b by means of two torque tubes 18a and 18b and a thermal contraction joint 20. As illustrated in FIG. 1, the torque tube 18a connects one end of the inner rotor assembly directly to bearing journal 16a whereas the thermal contraction joint 20 is located between torque tube 18b and bearing journal 16b.

As just stated, the inner rotor assembly 12 is supercooled so that its field windings 14 are superconducting. This may be accomplished in a conventional way known by those skilled in the art. Specifically, fluid refrigerant which is liquid helium in a preferred embodiment is introduced into the inner zone 22 of the rotor assembly through a suitable inlet conduit 24a which extends through end wall 26a comprising part of the rotor assembly. Thus inlet conduit is in fluid communication at its otherwise free end to a helium source through a conventional rotary transfer system (not shown). As indicated in FIG. 1, the liquid helium within zone 22, which is confined between end wall 26a and an opposite end wall 26b, forms an inner concentric pool 28 adjacent the inner surface of windings 14. This, of course, results from the centrifugal force to which the liquid helium is subjected as the inner rotor assembly rotates during operation of the overall generator. In a preferred embodiment, this liquid helium maintains the inner rotor assembly and specifically its field windings at a cryogenic temperature of approximately −450° F. As will be discussed hereinafter, some of the liquid helium boils off (reducing to a vapor) during operation of the generator, as a result of internal heat. As will also be seen, some of this vapor is used to cool the generators thermal radiator shield. However, the vapor not used in this way is passed back out of the generator by means of an outlet tube 24b. This tube extends from zone 22 through end wall 26a and to the rotary transfer system.

In addition to supercooled inner rotor assembly 12, generator 10 includes a warm outer generator assembly 30 which is at or above ambient temperature, for example, about 68° F. or higher, and which serves as the main structural element of the overall rotor in generator 10. As illustrated in FIG. 1, outer rotor assembly 30 is positioned concentrically around and radially spaced a short distance from inner rotor assembly 12 so as to define an axially extending circumferential annulus 32 therebetween. As stated previously, for electrical coupling reasons, the radial depth of this annulus is designed to a minimum value. Outer rotor assembly 30 is of course mounted for rotation along with inner rotor assembly 12. In order to accomplish this, the ends of the outer rotor assembly are respectively fixedly connected to previously recited bearing journals 16a and 16b.

The various components of generator 10 just described may be readily provided by those with ordinary skill in the art to which the present invention pertains and hence have not been described in detail. It should be quite apparent that these components are not the only components making up superconducting turbine generator 10. Obviously, this generator is comprised of other components including for example a cylindrical electromagnetic damper 34 fixedly connected concentrically around and against the outer surface of outer rotor assembly 30, as illustrated in FIG. 1. Other conventional components which have not been illustrated include the previously recited rotating transfer system, an overall generator housing, field leads, a heat exchanger comprising part of the inner rotor assembly and a torque tube heat exchanger associated with each of the torque tubes. All of these components as well as others which will not be discussed at all but which may be necessary in the overall operation of generator 10, may be readily provided by those with ordinary skill in the art. However, for purposes of clarity in describing the present invention, many of these conventional components will not be described in detail and some will not be described at all.

As illustrated in FIG. 1, generator 10 includes a thermal radiation shield 36 which is constructed in accordance with the present invention. This shield is provided for thermally insulating inner rotor assembly 12 by intercepting thermal radiation which would otherwise impinge upon its outer surface, actually the outer surface of field winding support 15 which defines the outermost bounds of what may be referred to as an inner cold zone incorporating field windings 14 and inner zone 22. The thermal radiation shield, as indicated, is cylindrical in shape and is concentrically located within previously recited annulus 32 between inner rotor assembly 12 and outer rotor assembly 30. The shield is held in this position relative to the rotor assemblies by mounting assemblies indicated generally at 38a and 38b. As illustrated in FIG. 1, mounting assembly 38a is positioned concentrically between and connected to one end of the shield and outer end of torque tube 18a. Mounting assembly 38b, which is illustrated in more detail in FIG. 5, is positioned concentrically between and connected to the other end of the shield and an outer end of torque tube 18b.

As stated previously, it is advantageous to cool the shield to a temperature below its ambient surroundings, actually to a cyrogenic temperature above that of the cold zone. By lowering the temperature of the shield to a temperature between that of the relatively warm outer rotor assembly and the supercooled inner rotor assembly, the heat radiated to the cold zone is significantly reduced and less refrigerator power is required in supercooling the inner rotor assembly. In accordance with one aspect of the present invention, radiation shield 36 is cooled by applying fluid refrigerant, specifically the previously recited helium in a preferred embodiment, in direct contact with the shield. In accordance with another aspect of the present invention, the fluid refrigerant is supplied in a continuous stream through the body of the shield so as to internally cool it. In order to accomplish this, the shield is designed to include internal passage means adapted to pass this continuous stream of fluid refrigerant, as will be discussed in detail hereinafter.

In a preferred embodiment of the present invention, the fluid refrigerant to be passed through shield 36 is helium gas, as stated previously. While this helium gas can be obtained from any suitable source, it is preferably obtained from zone 22 within inner rotor assembly 12. More specifically, it is well known to those skilled in the art that a certain portion of the circumferential pool of liquid helium within zone 22 in rotor assembly 12 is reduced to a gaseous state by vaporization through boil off as the rotor assembly operates. It is this gaseous helium which is passed out of zone 22 for use in internally cooling the shield. In order to accomplish this, generator 10 includes a plurality of helium transfer tubes 40 one of which is illustrated in FIG. 5 and two of which are illustrated in FIG. 1. As illustrated in both figures, these tubes extend from from torque tube 18b where they are tapped into fluid communication with the zone 22 through a conventional torque tube heat exchanger (not shown) and previously recited end wall 26. The torque tube heat exchanger is a continuous coiled tube extending along the length of and adjacent to the internal surfaces of one torque tube, as is well known to those in the art. Tubes 40 extend from the torque tube to an associated helium manifold 42, one of which is best illustrated in FIG. 5. The helium manifold is connected to and extends circumferentially around a section of the inner surface of shield 36 near one end thereof. As will be seen hereinafter, the helium gas passes from the center of zone 22 through transfer tubes 40 (through the interconnected torque tube heat exchanger) and into their associated helium manifolds 42 where it is ultimately introduced into the radiation shield.

A second plurality of manifolds indicated at 44 and a second plurality of transfer tubes indicated at 46 are provided at the other end of the radiation shield. Specifically, manifolds 44 extends circumferentially around and are connected to circumferentially spaced portions of the inner surface of shield 36 at its other end and a transfer tube 46 is in fluid communication with each of these latter manifolds and extends from there to a torque tube heat exchanger (not shown) associated with torque tube 18a. As will be discussed hereinafter, the helium gas is introduced into the shield via some of the transfer tubes 40 and manifolds 42, and is passed out of the shield and into torque tube 18a (actually its heat exchanger) by means of some of the manifolds 44 and associated transfer tubes 46. The flow path is reversed for the remaining transfer tubes and associated manifolds. More specifically, the flow starts at tubes 46 and passes through the shield and then through manifolds 42 and tubes 40. This helium gas is ultimately carried out of the entire generator through the torque tube heat exchangers and outgoing transfer tubes (not shown) and then through the previously recited rotary transfer system, or a similar system, where it is brought to ambient temperature by means of conventional large metal heat exchangers (not shown).

Turning now to FIGS. 2, 3 and 4 in conjunction with FIG. 1, attention is directed to a detailed description of thermal radiation shield 36 which is constructed in accordance with a preferred embodiment of the present invention. As illustrated in these figures, the shield is comprised of a cylindrical body 39 having an innermost external surface 41 and an outermost external surface 43, both of which extend from one end 45 of the body to its other end 47. As illustrated best in FIGS. 2 and 4, cylindrical body 39 is constructed of an inner cylindrical shell 48 having innermost surface 41 and an outer shell 52 having outermost surface 43. As illustrated, this outer shell is concentrically disposed around the inner shell such that their confronting internal surfaces, indicated at 56 and 58 respectively, tightly engage one another. For reasons to be discussed hereinafter, one of these shells is preferably thicker in cross section than the other, specifically, the inner shell 48 which is substantially thicker than the outer shell. In a preferred embodiment, the inner shell is approximately 0.22 inch thick whereas the outer shell is approximately 0.16 inch thick. This of course means that the entire shield is approximately 0.38 inches thick. While the two shells may be constructed of any suitable rigid material which is compatible with the present invention as described herein and with the operation of generator 10 generally, in a preferred embodiment they are both constructed of stainless steel.

Turning specifically to FIG. 3, inner shell 48 is illustrated apart from outer shell 52. As seen in this figure, the inner shell includes a plurality of grooves 60 in its confronting surface 58. These grooves which are equally circumferentially spaced from one another extend from one end section of the inner shell towards an opposite end section in directions parallel to its axis. The inner shell also includes what may be referred to as cross grooves or plenums 62 and 64. As illustrated in FIG. 3, cross groove 62 extends circumferentially entirely around surface 58 for interconnecting the adjacent ends 66 of grooves 60 while cross groove or plenum 64 extends circumferentially entirely around surface 58 for interconnecting common ends 68 of the axially extending grooves. For reasons to become apparent hereinafter, it is desirable to separate the various axial grooves 60 into a number of isolated groups. For example, in the embodiment illustrated, there are 24 axial grooves in all. These grooves are to be separated into four isolated groups of six. This may be accomplished by providing four separate cross grooves 62 each of which would interconnect the adjacent ends of one group of axial grooves and four separate cross grooves 64 each of which would interconnect the adjacent opposite ends of each group. However, for ease of manufacture, a single cross groove 62 and a single cross groove 64 are provided. The cross groove 62 may then be subdivided at the appropriate locations by welding four plugs 70 therein while the cross groove 64 may be appropriately subdivided by means of four welding plugs 72.

In addition to axial grooves 60 and cross grooves 62 and 64, inner shell 48 includes a plurality of passages 74, one for each of the isolated groups of axial grooves, and an equal plurality of passages 76, all of which are actually radial holes. Each of the passages 74 extends through the inner shell from innermost surface 41 to an associated section of cross groove 62 between two welding plugs 70. In a similar manner, each of the passages 76 extends through the inner shell from innermost surface 40 to an associated section of cross groove 64 between two welding plugs 72.

It should be readily apparent from the foregoing, that once outer shell 52 is assembled in place around inner shell 48, the various axial grooves 60 define passages which extend entirely internally within shield body 38 from one end section of the body and the cross channels or plenums 62 and 64 provide cross passages for interconnecting the ends of these axial passages. It should be equally apparent that these passages are separated into isolated groups, specifically four groups of six axial passages in the embodiment illustrated, by means of welding plugs 70 and 72. Obviously, entry into and out of each of these groups is provided by means of a passage 74 and associated passage 76. These latter passages are of course provided for passing a fluid refrigerant, specifically the aforerecited helium gas, through the shield body. In order to accomplish this, previously described plenums 42 are mounted around innermost surface 41 and over radial passages 74, as best illustrated in FIG. 5. The previously described manifolds 44 are also mounted to innermost surface 41 over passages 76. In this way, the helium gas which is located within zone 22 of inner rotor assembly 12 is pumped through some of the transfer tubes 40 (for example two) and into associated plenums 42 where it thereafter passes through the connecting passages 74 into the respective sections of cross groove 62 and axially along associated grooves 60. From there the gas passes into the various sections of the cross groove 64 and into plenums 44 through passages 76. From there, the gas passes through associated transfer tubes 46 and into torque tube 18a (actually its heat exchanger) where it is ultimately removed from the generator by means of a previously recited rotating transfer system. This flow is reversed for some groups of grooves 60 as illustrated by the arrows in FIG. 3. Specifically, the helium gas flows from cross grooves 62 to cross grooves 64 across two sets of grooves 60 and in the reverse direction across the other two groups.

The procedure just described results in the internal cooling of thermal radiation shield 36. Obviously, the amount of cooling which takes place and its uniformity across the surface of the shield will depend upon a number of factors, including the size of the internal passages, the amount of helium gas which is passed therethrough, its flow rate through any given passage, and, of course, the configuration and locations of the passages. For example, where a large number of closely spaced passages are provided uniformly across the interior of the shield and pass a large quantity of gaseous helium at a high rate, the shield can be uniformly cooled to a relatively low temperature as compared to the utilization of a lesser number of passages which are spaced further apart and which carry less helium. In this regard, it is to be understood that the present invention is not limited to the particular passage configuration illustrated.

Having described radiation assembly 36 in accordance with a preferred embodiment and the manner in which it is cooled within superconducting turbine generator 10, attention is now directed to the manner in which this shield is made. As stated previously, in a preferred embodiment, the shield is comprised of inner shell 48 and outer shell 52, both of which are constructed from stainless steel. As also stated, the inner shell is substantially thicker than the outer shell. In the particular embodiment illustrated, prior to assembling the two shells together, twenty-four axial grooves 60 are machined or otherwise cut with equal spacing (15°) around the circumference of surface 58. In a preferred embodiment, as best illustrated in FIG. 4, each of these grooves is semicircular or oval in cross section rather than rectangular in order to reduce stress concentration. These grooves are sized to provide a total cross sectional flow area approximately equal to the area of the torque tube helium supply and return tubes. For example, in a 300 MVA generator with 0.25 inch outer diameter by 0.032 inch wall helium pipes, each groove 60 has a semicircular cross sectional radius of approximately 1/16th inch. After cutting axial grooves 60, the cross grooves 62 and 64 are machined or otherwise cut across surface 58 for interconnecting the ends of grooves 60. As stated previously, for ease of manufacture, these cross grooves are subdivided for proper helium flow by welding four plugs in each of the circumferential grooves (plugs 70 and 72) so as to block helium flow to the adjacent set of grooves. In the 300 MVA generator just recited, each of these grooves is the same depth as the axial grooves (1/16th of an inch) and is 0.5 inch in axial width. Before the outer shell is assembled over the inner shell, the previously recited passages 74 and 76 are drilled through the inner shell and each of the cross grooves. These radial holes are sized to accomodate the previously described manifolds which are brazed onto each end of the shield after the latter is mounted on the rotor.

Having provided the various grooves and passages in inner shell 48, the outer shell is assembled thereto. While this may be accomplished in any suitable manner, in the preferred embodiment, the outer shell is assembled by shrinking it over the inner shell in a conventional manner. After this has been done, the ends 44 and 46 are welded together to prevent helium leakage through the rotor vacuum.

What is claimed is:

1. A radiation shield for use in a superconducting turbine generator or the like, said shield comprising:
    (a) a cylindrical main body having opposite ends, an innermost surface extending from one end to the other and an outermost surface extending from one end to the other, said body including inner and outer concentric layers which engage one another along confronting internal surfaces;
    (b) at least one internal groove located in one of said confronting internal surfaces, said groove defining an internal passage located entirely within said body and adapted to pass a fluid refrigerant therethrough;
    (c) an entry passage extending through one of said layers and in fluid communication with one end of said groove for introducing said fluid refrigerant therein; and
    (d) an exit passage extending through one of said layers and in fluid communication with the other end of said groove for passing said refrigerant out of said body.

2. A radiation shield according to claim 1 wherein both of said layers are constructed of stainless steel.

3. A radiation shield according to claim 1 wherein said groove is semicircular in cross-section.

4. A radiation shield according to claim 1 including a group of internal grooves which extend from one end section of said body to the other and which are circumferentially spaced from one another, said shield including a first cross groove located in one of said confronting surfaces and in fluid communication with said entry passage and adjacent ends of said internal grooves for placing said entry passage in fluid communication with all of said grooves and a second cross groove located in one of said confronting surfaces and in fluid communication with said internal grooves for placing said exit passage in fluid communication with all of said grooves.

5. A radiation shield for use in a superconducting turbine generator or the like, said shield comprising:
 (a) a cylindrical body including
  (i) an innermost external surface and an outermost external surface, both of which extend from one end of said body to the other,
  (ii) a metal inner shell including said external innermost surface and having a predetermined cross-sectional thickness, and
  (iii) a metal outer shell including said external outermost surface and thinner in cross-section than said inner shell, said outer shell constructed of a heat shrinkable material and being concentrically disposed around said inner shell in a shrink fitted manner such that their confronting internal surfaces tightly engage one another;
 (b) at least one group of axial grooves located in the confronting surface of said inner shell and defining internal passages adapted to pass helium therethrough, said grooves extending from one end section of said body to the other and being circumferentially spaced from one another;
 (c) first and second cross grooves located in said confronting surface of said inner shell at opposite ends of said axial grooves, each of said cross grooves being in fluid communication with adjacent ends of said axial grooves for interconnecting said ends;
 (d) an entry passage extending through said inner shell from said innermost surface to said first cross groove for introducing said fluid helium into said axial grooves through said first cross groove; and
 (e) an exit passage extending through said inner shell from said innermost surface to said second cross groove for passing said helium out of said axial grooves through said second cross groove.

6. A radiation shield for use in a superconducting turbine generator or the like, said shield comprising:
 (a) a cylindrical main body having opposite ends, an innermost surface extending from one end to the other and an outermost surface extending from one end to the other, said body including inner and outer concentric layers which engage one another along confronting internal surfaces, said outer layer being constructed of a heat shrinkable material shrink fitted around said inner layer;
 (b) at least one internal groove located in one of said confronting internal surfaces, said groove defining an internal passage located entirely within said body and adapted to pass a fluid refrigerant therethrough;
 (c) an entry passage extending through one of said layers and in fluid communication with one end of said groove for introducing said fluid refrigerant therein; and
 (d) an exit passage extending through one of said layers and in fluid communication with the other end of said groove for passing said refrigerant out of said body.

7. A radiation shield according to claim 1 wherein both of said layers are constructed of stainless steel.

8. A radiation shield for use in a superconducting turbine generator or the like, said radiation shield comprising:
 (a) a main body having opposite external surfaces, said body including at least two layers which engage one another along confronting internal surfaces;
 (b) internal passage means located entirely within said body and adapted for passing a fluid refrigerant therethrough, said internal passage means being defined by groove means in the internal surface of at least one of said layers;
 (c) entry passage means extending into said body from one of said external surfaces, said entry passage means being in fluid communication with said groove means for introducing said fluid refrigerant therein; and
 (d) exit passage means extending into said body from one of said external surfaces, said exit passage means being in fluid communication with said groove means for passing said refrigerant out of said body.

9. A radiation shield according to claim 8 wherein said two layers include an inner layer and an outer layer, said outer layer being constructed of a heat shrinkable material shrink fitted around said inner layer.

10. A radiation shield according to claim 9 wherein both of said layers are constructed of stainless steel.

11. A radiation shield according to claim 10 wherein said outer layer is constructed of heat shrinkable stainless steel material shrink fitted around said inner layer.

* * * * *